May 3, 1938.  R. B. FUNK  2,115,909
AIR CONTROL DEVICE
Filed Dec. 1, 1934  3 Sheets-Sheet 3
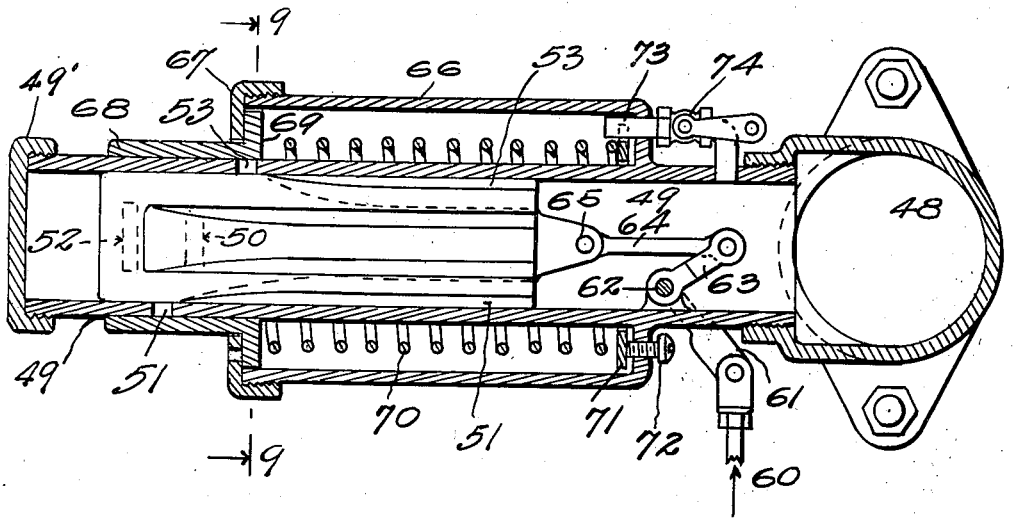
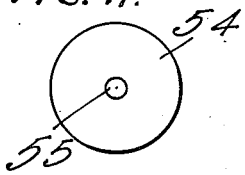
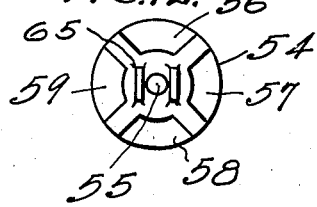
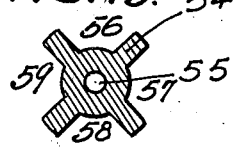
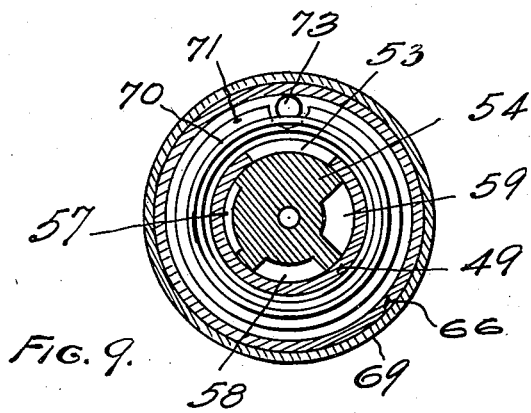
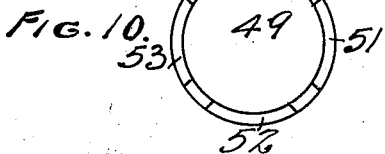
Inventor
RUFUS B. FUNK
By Chas K. Davies
Attorney Patented May 3, 1938

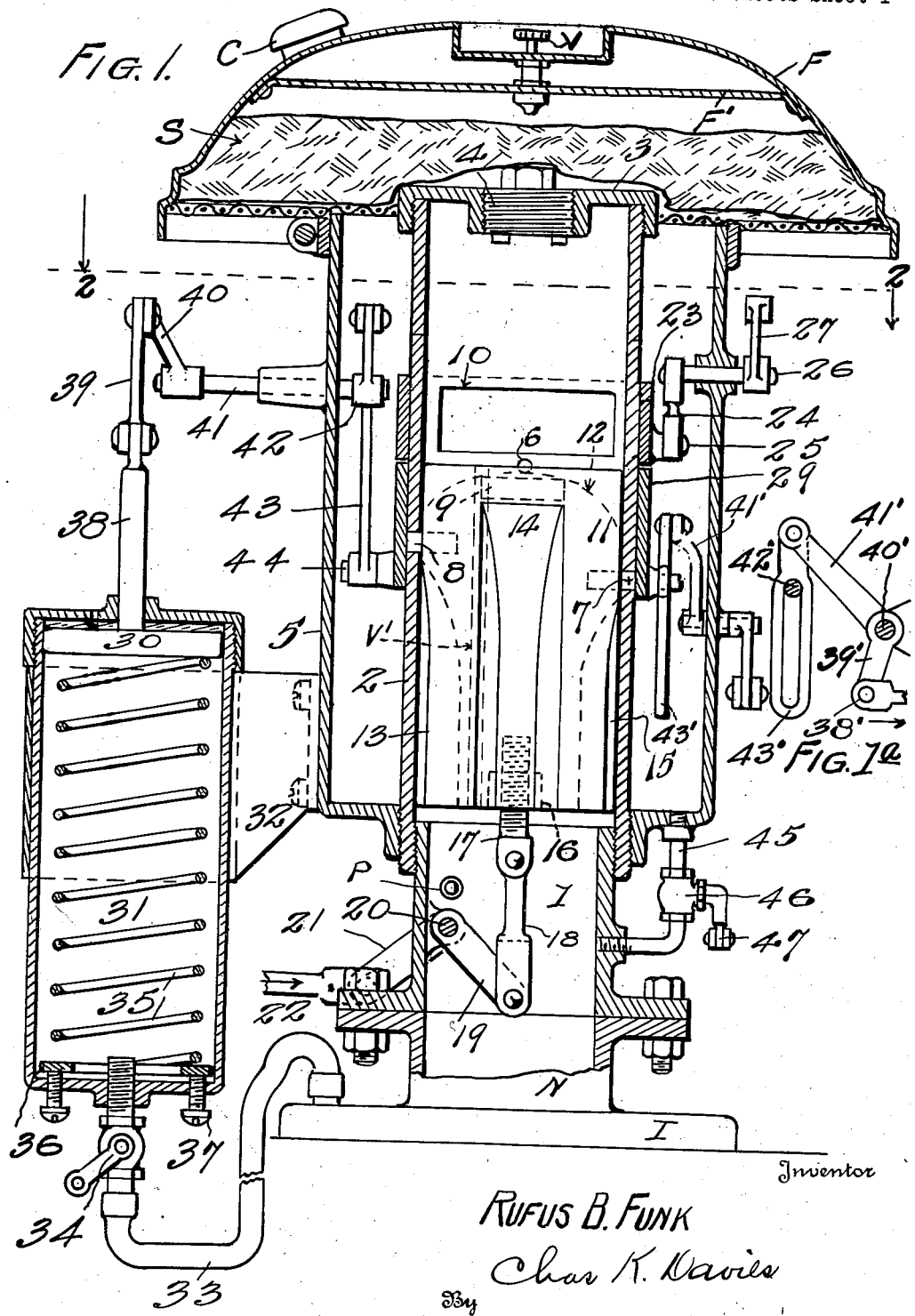

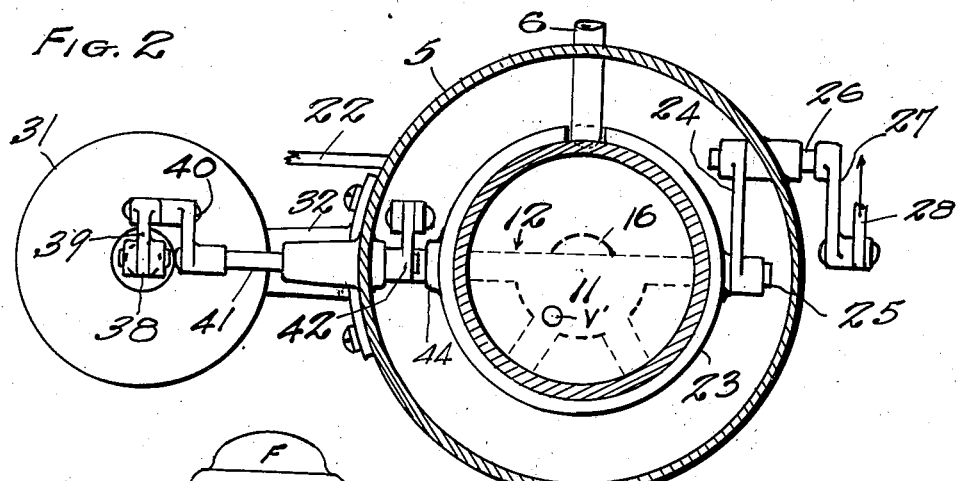

2,115,909

UNITED STATES PATENT OFFICE 2,115,909

AIR CONTROL DEVICE

Rufus B. Funk, Washington, D. C.

Application December 1, 1934, Serial No. 755,640

15 Claims. (Cl. 123—124)

My present invention relates to an improved air control device for metering, governing, and regulating the supply or intake of air in accord with, and with relation to the varying conditions arising in the feed of the fuel mixture to internal combustion engines employed for propelling vehicles and craft. By the utilization of the device of my invention the intake of air for use in the fuel mixture is metered in relation to the speed of the engine or motor when running, whereby the volume of air may be controlled from a minimum quantity when the engine is running cold or under a heavy load, and whereby the quantity may be increased to a maximum under a comparatively lighter load on the engine, or while the engine is running at high speeds.

By this metering, governing, and regulating the volume of air to the fuel mixture I economize in the consumption of gasoline, and secure a substantially greater mileage for the fuel consumed than is accomplished under existing conditions.

The object of my invention is to provide a variable supply of air for carburetion, in accordance with, and adapted to, substantially all of the varying conditions encountered in the operation of the engine. This variation in the supply of air is accomplished by means, which includes an auxiliary air supply device, which is rendered operative, or inoperative, either automatically, or at the will of the engine operator, to vary the available supply of air for the carbureter. This secondary or auxiliary air supply device is employed in addition to the main valve device which, of course, controls intake of air for the carbureter, and the main valve controls the feed of all air supplied to the carbureter. For this purpose the feed valve, or main control valve, is located between the intake manifold of the engine at one side, and all air supply ports on the other side of the feed valve.

My invention is adapted for use in charge forming devices, such as carbureters having air inlets at a plurality of points, as in Figure 1, where the gas and air are commingled; or the invention may be utilized as an auxiliary air-control device or attachment as in Figure 8, to an engine intake passage for admitting air, while the engine is running, to standard and other well known types of carbureters for internal combustion engines. In both instances, the air control device is rendered operative at the initial starting of the motor or engine, and remains operative while the engine is in operation or running, but may be shut off wholly or partially, for cold-starting or heavy labor, either automatically, or manually.

In the installation of my invention on an automotive vehicle, I preferably employ the accelerator pedal or fuel control element or mechanism, for controlling the passage of the fuel mixture through the carbureter and for controlling the intake of air as part of the mixture; and the same element is also employed in connection with the air control device when the latter is utilized as an auxiliary air-control or air-intake attachment for carbureters now in use.

In the embodiment of my invention as a carbureter, the unit may be manufactured, assembled, and installed at comparatively low cost of production and inexpensive service; and when embodied in an auxiliary air-intake, the device may with facility and convenience be combined with the operating parts of standard types of carbureters.

In carrying out my invention I employ fluid pressure operated means under control of the engine, as suction from the intake manifold when the engine is running, for automatically rendering the device operative, by moving an auxiliary air supply valve to open the air-intake ports in order that passage of air through the latter may be metered, regulated, and controlled in accord with the operating conditions of the motor. The invention consists in certain novel constructions, combinations, and arrangements of parts for the above purposes, as will hereinafter be more fully pointed out and claimed.

In the accompanying drawings I have illustrated my invention in two physical embodiments, wherein the parts are combined and arranged according to two modes I have thus far devised for the practical application of the principles of my invention, but it will be understood that various changes and alterations may be made in the exemplifying structures, within the scope of my appended claims, without departing from the principles of the invention.

Figure 1 is a central, vertical sectional view, with some parts in elevation, of a down-draft carbureter embodying my invention.

Figure 1a is a detail view of the manual control for the auxiliary air supply.

Figure 2 is a horizontal sectional view at line 2—2 of Figure 1, showing the operating means for the choke valve, and the operating means for the auxiliary air supply valve of the carbureter.

Figure 3 is a transverse sectional view of the control valve.

Figure 4 is a detail side view of the suction-operated auxiliary air supply valve; and Figure 5 is a similar view of the choke valve and its operating connections.

Figure 6 is a detail exterior view of the ported casing for the control valve.

Figure 7 is a view in elevation showing the device of my invention installed as an auxiliary air-intake for a down-draft carbureter of well known make.

Figure 8 is an enlarged, horizontal sectional view at line 8—8 of Figure 7.

Figure 9 is a transverse sectional view at line 9—9 of Figure 8.

Figure 10 is a diagrammatic view of the valve-casing of Figure 8 indicating the relative positions of the intake ports.

Figure 11 is a view at the outer end of the control valve.

Figure 12 is a view at the inner end of the control valve; and Figure 13 is a cross sectional view of the control valve of Figure 8, showing all of the metering ports of the valve.

In the embodiment of the invention in Figure 1 I illustrate a down-draft carbureter, which is attached, as by means of the usual nipple N, to the intake manifold I of an internal combustion engine generally employed for propelling automotive vehicles. The carbureter is equipped with a filtering hood F, located at the top thereof, for cleansing the air before admission to the fuel mixture, and the hood is also provided with means for lubricating the operating parts of the carbureter, as will be described.

In attaching the carbureter to the nipple I employ a flanged tube-section 1 that forms the intake chamber for the fuel mixture to the manifold I, and a sleeve or valve casing 2 is threaded on the exterior of the upper end of the tube section. The upper end of the valve casing, which is enclosed by the hood F, is closed by means of a suitable cap 3, and an appropriate lubricating device for parts within the valve casing is indicated at 4 and mounted in the cap.

An exterior housing 5 encloses the valve casing and forms an annular air chamber around the valve casing communicating with the interior of the filtering hood, and as indicated in Figure 1 the hood is conveniently mounted on the top or upper open end of this housing.

The valve casing is fashioned with a number of auxiliary air ports, here designated as 7, 8, and 9, which as best seen in Figure 6 are located at one side of the longitudinal center of the casing, and arcuate in shape. These ports extend transversely of the sleeve or casing, and are spaced longitudinally at predetermined intervals, to admit air for commingling with the fuel mixture, the gasoline for the fuel mixture being admitted through the main pipe or nozzle 6 that projects through the housing 5 into the annular chamber surrounding the valve casing, and to the interior of the valve casing.

A smaller gas port P is indicated in Figure 1 opening into the intake chamber 1, to admit fuel gas for combustion when the engine is idling.

Above the auxiliary air intake ports 7, 8, and 9, is located the main intake port 10, which, when open, admits the main supply of air to the fuel mixture coming from the inlet pipe 6 and the annular chamber surrounding the valve casing, into the interior of the valve casing.

While I have shown the intake ports for auxiliary air as three in number, and of arcuate shape, it will be understood that the number of ports may be varied, their shape changed, and their spaced intervals changed, to suit different conditions, constructions, and operations, to be met, and alterations may be made with respect to the main inlet port 10 for various purposes.

Passage of fuel mixture through the valve casing, as well as admission to and passage of air through the casing from the auxiliary ports 7, 8, and 9, is controlled through the use of a slidable, or reciprocable, control valve 11, that is operable within its casing 2 to feed the fuel mixture to the intake manifold of the engine. The valve is fashioned with a longitudinally extending port 12 which forms the main fuel passage of the carbureter within the valve casing, and for this purpose the valve on its side opposite the auxiliary air intake ports, and adjacent the main port 10, is flattened from its lower end upwardly. At its upper portion the flattened port curves inwardly, and the flat face or wall of the port indicated by dotted line in Figure 2 and full line in Figure 3, merges in the rounded upper end of the port, that terminates, as indicated by dotted lines in Figure 1, just below the top flat end of the valve. Thus, from its upper end the port 12 increases in capacity as it extends toward the lower end of the valve, and at a suitable point in the length of the port the maximum capacity is attained and continues to the lower end of the valve. When the valve is elevated or lifted so that the port 12 is open to the main intake port 10, it will be apparent that (when choke valve 23 is open) air for the fuel mixture may flow through port 10, and thence down through the port or main passage 12 of the carbureter into the intake chamber 1, and thence to the intake manifold.

On the side of the control valve, opposite to the main port 12, I provide auxiliary, metering, intake ports 13, 14, and 15, complementary to the auxiliary air ports 8, 9, and 7 of the valve casing, and adapted to register with these ports. These valve-ports also extend longitudinally of the valve and are open at the lower end of the valve to the intake chamber 1. At their upper ends the valve ports gradually curve outwardly and terminate with their intake lips just below the lower edges of the casing-ports 7, 8, and 9. The capacity of these valve-ports thus gradually increases from a minimum at their upper ends to a maximum at a predetermined point in their length, and from this point the maximum capacity is maintained to the lower, outlet ends of the ports, at the bottom of the valve.

To insure freedom of movement of the slide, control valve, a vent passage V' is extended through the valve from top to bottom for the purpose of equalizing fluid pressure above and below the valve.

It will be understood that the relation between the auxiliary casing-ports and the complementary valve-ports, may be varied for the purpose of accomplishing admission of air from the annular air chamber within the housing 5, through the valve casing, and into the intake chamber 1, and the volume of air thus admitted may be gradually built up from a minimum quantity to a maximum quantity, so that these auxiliary ports will meter, control, and regulate the admission of air, when the presence of the air is desirable, as for instance when the engine is operating at high speed.

When the engine is cold, as at starting, or when the engine is laboring under a heavy load, and rich fuel is required, the auxiliary air intake valve ports and the casing ports are closed by the throttle valve 29, as in Figure 1. As the operating engine warms up, or as the load is decreased, the throttle valve 29 may be moved to uncover the casing-ports 7, 8, and 9, as the desirability of a lean fuel mixture increases, the admission of air through the auxiliary ports being controlled by movement of the control valve or feed valve 11, as described.

The position of the control valve 11 is determined by the position of the accelerator of the automotive-vehicle, which of course controls the movement of fuel mixture through the carbureter. For this purpose I employ a threaded boss 16 on the lower end of the control valve 11 into which an adjusting screw 17 is threaded, to facilitate adjustment in the attachment of the valve-operating mechanism. A link 18 is pivoted to the screw 17, and a lever-arm 19, which is fixed on the pivot pin 20, provide operative connections to the valve within the intake chamber 1. The pivot pin 20 extends through the wall of the intake chamber and is journaled to turn therein, and on the pin exterior of the chamber, a lever 21 is fixed. The lever at its free end is pivotally connected with a connecting rod 22 that, in turn is suitably connected with the accelerator pedal of the engine. A push on the connecting rod, as indicated by the arrow in Figure 1, lifts the control valve 11 to bring its port 12 into register with the main intake port 10 for control of the carbureter, and when so desired, the auxiliary casing ports and valve ports are brought into register to admit air if and when the throttle valve 29 is open.

A choke-collar 23 surrounds the main-ported part of the valve casing, to control admission of air through the main fuel port 10 for use with the vaporized gasoline from the main inlet port 6. Low speed gas is admitted to the intake chamber 1 through the port P in Figure 1.

The choke collar 23 is manually controlled, as from the instrument board or from the dash board of the vehicle, to cover, uncover, or partially open, the main carbureter intake port 10, in the operation of the carbureter, the collar or valve being lifted from its position of Figure 1 to open or partially open the port. The manual control for the choke valve includes a lever arm 24 that is pivotally connected at 25 to the exterior side of the choke collar, and the lever arm is fixed on one end of a pivot pin 26 journaled to rock in the wall of the housing 5. At the exterior of the housing a lever 27 is fixed on the pivot pin, and this lever has a pivotal connection to a rod or link 28 that is manually actuated from a suitable location readily accessible to the driver of the automotive vehicle. When the rod is pulled in the direction of the arrow in Figure 5 the choke collar or choke valve 23 is lifted to uncover, or to partially uncover the main port 10 for regular operation of the engine after the latter has been started.

The air supply valve 29, which controls admission of air through the auxiliary air ports 7, 8, and 9, also surrounds the valve casing, and this valve is lowered, either automatically, or by manual operation, to successively uncover the auxiliary air ports.

For the automatic control of the air supply valve 29 I employ herein fluid pressure operated means actuated by suction from the engine when the latter is running, while for the manual control of the air supply valve, including a limitation of the automatic closing of the air supply valve, I utilize control mechanism that is readily accessible to the driver of the automotive vehicle, and connected with the air supply valve.

The automatic or suction device for opening the air supply valve when the engine is running includes a piston 30 that is reciprocable in the cylinder 31, and the cylinder is supported in suitable manner, as by a bracket 32 attached to the housing 5 of the carburetor. One end of the cylinder communicates through a flexible hose 33 with a portion of the engine, as the intake manifold I, and a control or cut-off valve 34 is interposed between the cylinder and the manifold to regulate the vacuum in the cylinder; the cut-off or regulating valve 34 being manipulated manually through suitable connections.

A spring 35 which is interposed between the upper head of the cylinder and a spring ring or annular plate 36 in the lower end of the cylinder, tends to lift the piston 30, and thus close the air supply valve.

The spring plate or ring 36 forms a tension-adjusting element, in connection with adjusting screws 37 in the bottom of the cylinder, which screws bear against the under side of the adjusting or tension element, and these screws may be turned to vary the tension of the spring. The tension of the spring is sufficient to close the auxiliary air supply valve, but this tension is overcome by suction from the engine to open the auxiliary air supply valve, and of course the tension is overcome by the manual control of the auxiliary air supply valve. When the engine is running at sufficiently high speed to create suction for the purpose, the auxiliary air supply valve is automatically opened, and then the control valve 11 may be or is operated to open the auxiliary ports for admission of the extra supply of air to the carburetor, in accord with the speed of the engine.

Through the connections including the piston 30 and its stem 38, link 39 and lever 40 (the latter rigid with a pivot pin 41 journaled to rock in the wall of the housing 5) and the lever-arm 42 in the annular air chamber, together with a link 43 pivoted at 44 on the auxiliary air supply valve, the latter is automatically operated.

In addition to the above described automatic control of the auxiliary air supply valve 29, I provide the hand control indicated in Figures 1 and 1a, where the pull rod 38' is controlled from the dash board of the vehicle. A pull on the rod in the direction of the arrow in Figure 1a, swings a lever arm 39', which is fixed to the pivot pin 40', and through a crank arm 41' and a slotted link 43' fitted over the pivot pin 42' of the auxiliary air supply valve, the latter may be lowered. The slotted link, it will be apparent, permits the auxiliary air supply valve to be lowered by means of the suction-operated mechanism without affecting the manual control mechanism. It will also be apparent that the manual control rod 38' may be pulled to force down, or open, the valve against tension of the spring 35 for the purpose of regulating the admission of air through the auxiliary air ports. Thus the valve may be depressed to open only the port 9 and there held in adjusted position, and thereafter the two remaining ports 8 and 7 will be opened and closed by the automatic operation of the auxiliary air supply valve, to control admission of air through these two valves.

In Figure 1 means are disclosed for permitting idle-running air to enter the intake chamber 1 from the air-chamber in the housing 5, through a short pipe or tube 45, in which a regulating valve 46 is interposed, and the valve may be manually controlled by suitable connections at 47.

In Figure 1 the filter hood F is shown with a horizontal interior partition F' which forms an upper oil reservoir that may be filled through the inlet that is closed by the closure cap C, and an oil valve V is provided to feed the oil to a sponge 8, or other suitable filler that is adapted to filter the air and collect dust therefrom. The oil is sprayed from the sponge into the annular chamber of the housing for lubricating the operating parts in the chamber.

As indicated in Figure 7 the auxiliary air intake device may be combined with any suitable or standard carbureter, in suitable manner, as by the attaching, flanged coupling sleeve 48 that is bolted to the nipple N of the intake manifold I, or at any other suitable point for supplying air to the carbureter or to the intake manifold.

For convenience the auxiliary attachment is shown as projecting in a horizontal plane from the carbureter, and the valve casing 49 is threaded at one end to the coupling, while its other, outer end, is closed by a suitable cap 49'. In this instance the valve casing is fashioned with four arcuate, longitudinally spaced, auxiliary, air intake ports 50, 51, 52, and 53, and the control valve 54, which is fashioned with a longitudinally extending vent passage 55 to equalize fluid pressure at its opposite ends, is formed with four complementary, longitudinally extending ports 56, 57, 58, and 59, to register with the casing ports, and to perform the same functions as the similar air ports in the valve and valve casing of the carbureter in Figure 1.

The carbureter to which the auxiliary air control device is attached may receive its usual supply of air in customary manner, and the control valve 54 may be manipulated as desired for an auxiliary air-intake through the rod 60 which connects with a suitable control device of the engine, as the accelerator. The connecting rod is pivotally connected to a lever 61 exterior of the valve casing and rigidly secured to a pivot pin 62 mounted in the wall of the casing, and a lever arm 63 is fixed on the pivot pin inside the casing. A link 64 pivotally connects the lever arm 63 with the perforated ears 65 of the valve, and a push on the rod 60 in the direction of the arrow in Figure 8 slides the valve in its casing to open or close the ports of the casing.

A suction device is mounted on the exterior of the valve casing, which includes a cylinder 66 that may be integral with the casing and spaced therefrom to form a suction chamber that is closed at its inner end and provided with a flanged head-ring 67 threaded on the casing at its outer end. A sleeve 68 on the exterior of the casing performs the functions of an air supply valve in connection with the auxiliary ports 50, 51, 52 and 53, and this valve has an annular flange 69 retained within the suction chamber by means of the head ring 67. A tension spring 70 at one end bears against the flange 69, and at its other end the spring bears against a tension ring 71 surrounding the valve casing and located in the suction chamber. By means of the adjusting screws 72, the tension of the spring may be varied to a desired degree for closing the air supply valve. The air supply valve is automatically opened by suction from the engine through the instrumentality of a suction pipe 73 having one end in the suction chamber 66 and its other end in the valve casing, and the slide valve or control valve is operated after the air supply valve has been opened under fluid pressure due to the vacuum created by the engine while running. The fluid pressure is controlled or regulated by means of a valve 74 in the pipe 73, which valve is operated manually through suitable connections.

While I have not illustrated manually operated means in Figure 8 for sliding the sleeve valve 68 to uncover the ports 50, 51, 52, 53 of the valve casing, it will be understood that such mechanism may be employed for that purpose similar to the mechanism of Figure 1a. When the manual control is employed in Figure 8 the automatic control of the auxiliary air intake device can operate independently thereof, as in Figures 1 and 1a.

In neither of the two exemplifications is it desirable that the auxiliary air intake valve be opened when the engine is cold, nor should it be opened at other times when a rich fuel mixture is desirable or necessary, and under such conditions the suction regulating and control valves 34 and 74 are manually closed.

When, however, the engine is operating at high speed, or under a comparatively light load, and under other conditions where a lean fuel mixture can be used, either of the auxiliary air intake control devices can advantageously be employed for economizing in fuel.

Having thus fully described my invention, what I claim as new and desire to secure by Letters Patent is:—

1. In a carbureter, the combination with fuel-mixture feeding means including a valve casing and control valve therein, of an auxiliary air supply mechanism at the atmospheric side of the control valve, and including ports in the casing and complementary ports in the valve, of an exterior sleeve valve for the casing ports, suction operated means for automatically moving the sleeve valve to open the casing-ports, means for automatically closing the valve over said ports, and manually operated means for limiting the closing movement of the sleeve valve.

2. In a carbureter, the combination with fuel-mixture feeding means including a valve casing and valve therein, of an auxiliary supply mechanism including air ports in the casing open to the atmosphere and complementary ports in the valve, a valve controlling the casing ports and suction operated means for opening said valve, a spring device for closing said last mentioned valve, and manually operated means for opening said last mentioned valve.

3. In an air control device for internal combustion engines, the combination with a casing having a plurality of ports open to the atmosphere, a plunger valve movable in said casing and having complementary ports, an accelerator for the engine, and operative connections between the accelerator and said valve, of a secondary valve for the atmospheric ports, and manual and automatic means for moving the secondary valve to control the casing ports.

4. In an air control device for internal combustion engines, the combination with a casing having longitudinally spaced air ports open to the atmosphere, a plunger valve in the casing having longitudinal grooves forming complementary air ports, and means for operating said valve, of a secondary valve for the casing ports, a spring actuated suction device for controlling the secondary valve, means for regulating and controlling the suction device, and manually operated means for controlling the secondary valve in conjunction with and independently of the suction operated means.

5. In a carbureter, the combination with fuel-mixture feeding means including a valve casing and control valve therein, of an auxiliary air supply mechanism at the atmospheric side of the control valve, and including ports in the casing and complementary ports in the valve, of an exterior sleeve valve for the casing ports, suction operated means for automatically moving the sleeve valve to open the casing ports; manually operated means for controlling the operation of said suction operated means; means for automatically closing the sleeve valve over said ports; and manually operated means for controlling the movement of the sleeve valve.

6. In a carbureter having operative control means, in a means for supplying air for the fuel mixture for internal combustion engines, the combination with a ported valve casing and a valve sliding therein and ported with grooving varying in depth from nil to maximum for a graduated cooperation with complementary porting of the valve casing and controlling the admission of air after it reaches the porting of the valve casing, and operative connections between said valve and said operative control means, of manual means and automatic means for opening and closing said casing porting from the exterior.

7. In a device for supplying auxiliary air to the fuel mixture of internal combustion engines having speed control means, the combination with a ported valve casing and a sleeve valve sliding thereon, and manual and automatic means for operating said valve, of a valve sliding within said ported valve casing and ported with grooving varying in depth from nil to maximum for a graduated cooperation with complementary porting of the said valve casing and controlling the admission of air after it reaches the porting of the valve casing, and operative connections between the valve sliding within the casing and said speed control means.

8. In a carbureter for internal combustion engines, a device for supplying air for the fuel mixture comprising, a valve casing having a plurality of ports therein for the entrance of main and auxiliary air, a valve sliding within said valve casing, said valve being ported for graduated cooperation with said ports, a sleeve sliding on said casing for controlling the entrance of main air, a second sleeve sliding on said casing for controlling the entrance of auxiliary air, and means for controlling the position of said sleeves.

9. A device for supplying air for the fuel mixture for internal combustion engines comprising a ported valve casing, a valve sliding within said casing, said valve having graduated ports for cooperation each with a separate complementary port in said valve casing, other means for successively opening and closing the ports of the valve casing to the admission of air, manually controlled means for controlling said first named means, means controlled by the intake suction of the engine for controlling said first named means, and manually controlled means for controlling said valve.

10. In a carbureter for internal combustion engines, a device for supplying air for the fuel mixture comprising a ported valve casing having main and auxiliary air inlets, means for controlling the passage of air through the auxiliary air inlet, manually controlled means for controlling said first named means, means controlled by the intake suction of the engine for controlling said first named means, and a manually controlled valve slidable in said casing for controlling the passage of main and auxiliary air.

11. A device for supplying air for the fuel mixture for internal combustion engines comprising means having a plurality of inlet openings for the passage of air, manually controlled means for successively opening and closing said openings to the passage of air, means controlled by the intake suction of the engine for successively opening and closing said openings to the passage of air, and throttle controlled means for simultaneously opening and closing said openings to the passage of air.

12. A device for supplying air for the fuel mixture for internal combustion engines comprising a plurality of inlet openings for the passage of air, manually controlled means for successively opening and closing said openings, means controlled by the intake suction of the engine for successively opening and closing said openings, said first named manually controlled means including means for limiting the range of action of said suction controlled means and throttle controlled means for simultaneously opening and simultaneously closing said openings to the admission of air.

13. In a means for supplying air for the fuel mixture of internal combustion engines the combination of a plurality of ports which are opened simultaneously by throttle control and which are successively and positively opened by manually operated means.

14. In a device for supplying air for the fuel mixture of internal combustion engines the combination of a valve casing having porting for the admission of air, a sleeve valve on the casing, a slide valve within the casing, means responsive to fluid pressure for operating one of said valves, manually operated means for operating said one of said valves including means for placing stationary settings thereof regardless of the speed of the engine, and throttle controlled means for operating the other of said valves.

15. In a device for supplying air for the fuel mixture of internal combustion engines having porting for the admission of air, the combination of throttle controlled means for opening the porting, means responsive to fluid pressure for opening the porting, and manually operated means for opening the porting including means for placing stationary settings thereof regardless of the speed of the engine.

RUFUS B. FUNK.